(12) United States Patent
Moghe et al.

(10) Patent No.: US 6,929,942 B2
(45) Date of Patent: Aug. 16, 2005

(54) PROCESS FOR THE TREATMENT OF INDUSTRIAL EFFLUENTS USING MARINE ALGAE TO PRODUCE POTABLE WAFER

(75) Inventors: Pramod Prabhakar Moghe, Pune (IN); Vinita Vinay Panchanadikar, Pune (IN); Arvind Gajanan Untawale, Goa (IN); Vinod Kashinath Dhargalkar, Goa (IN)

(73) Assignee: Council of Scientific and Industrial Research, New Delhi (IN)

( * ) Notice: Subject to any disclaimer, the term of this patent is extended or adjusted under 35 U.S.C. 154(b) by 351 days.

(21) Appl. No.: 10/167,199

(22) Filed: Jun. 11, 2002

(65) Prior Publication Data

US 2003/0034299 A1 Feb. 20, 2003

Related U.S. Application Data

(63) Continuation-in-part of application No. 09/482,766, filed on Jan. 13, 2000, now abandoned.

(30) Foreign Application Priority Data

Aug. 10, 1999 (IN) ........................................ 1086/DEL/99
Aug. 10, 1999 (IN) ........................................ 1085/DEL/99

(51) Int. Cl.$^7$ ................................................. C02F 3/00
(52) U.S. Cl. ...................... 435/262.5; 502/7; 210/96.1; 210/601
(58) Field of Search ........................ 435/262.5; 502/7; 210/96.1, 601

(56) References Cited

U.S. PATENT DOCUMENTS

| 4,454,044 A | 6/1984 | Klein |
| 5,064,531 A | 11/1991 | Wang |
| 5,176,100 A | 1/1993 | Fujino |

FOREIGN PATENT DOCUMENTS

| DE | 1974751 | 4/1999 |
| JP | 63-178890 | 4/1999 |

OTHER PUBLICATIONS

Bold et al. "Introduction to the Algae", 1985, 2nd ed., Prentice Hall, p. 21, 395, 516.

*Primary Examiner*—Irene Marx
(74) *Attorney, Agent, or Firm*—Rankin, Hill, Porter & Clark LLP

(57) ABSTRACT

The invention relates to a process for the treatment of industrial effluents using marine algae to produce potable water which process comprises the steps of: (i) contacting diluted effluents with marine red algae selected from *Porphyra* and *Liagora*, containing polysaccharides and having sulfate/acetyl functional group on the cell wall and galactopyranose on their cell membrane, for a period of at least 30 minutes preferably under stirring; (ii) treating the effluents from step (i) with calcareous material for a period of at least 30 minutes, preferably under stirring; (iii) separating the coagulated material so formed from the supernatant by conventional methods; and (iv) treating the supernatant with conventional ion-exchange resins such as cationic ion-exchange resins, anionic-ion exchange resins and activated charcoal to produce potable water.

12 Claims, No Drawings

PROCESS FOR THE TREATMENT OF INDUSTRIAL EFFLUENTS USING MARINE ALGAE TO PRODUCE POTABLE WAFER

CROSS-REFERENCE TO RELATED APPLICATIONS

This is a continuation-in-part of application Ser. No. 09/482,766, filed Jan. 13, 2000 now abandoned.

BACKGROUND OF THE INVENTION

1. Field of Invention

The invention relates to an effluent treatment process using marine algae. More specifically, the invention is concerned with the separation of organic substances such as lignin and other coloring matter in aqueous industrial effluents by treatment with marine algae to produce potable water and sludge containing unwanted contaminants.

2. Description of Related Art

As is known in the state of art, industrial effluents are major contaminants in any country. Accordingly, the invention is directed to a novel method for the treatment of effluents emitted specifically by pulp and paper mills in the paper industry and in the production of consumable liquor by the alcohol industry. The waste produced by the paper industry is basically a black liquor comprising organic matter, lignin, inorganics and coloring matter. Similarly, the waste or effluent of the alcohol industry also contains lignin, phenolic compounds, pigments and other substances.

Lignin may be defined as amorphous polyphenolic material arising from an enzyme mediated dehydrogenative polymerization of three phenylpropanoid monomers, for example, conyferyl, sinapyl and p-coumaryl acohols. Lignin (from the Latin *lignum*, wood), after cellulose, is the principal constituent of woody structure of higher plants deposited in xylem cell walls and in part located in the intercellular spaces. The sulfite waste liquors from paper mills contain about 3 to 6% lignin, which is not easily biodegradable. This lignin may act as a source of vanillin, syringic aldehyde, and can be used as extender for phenolic plastics as well as to strengthen the rubber, as oil mud additive to stabilize asphalt, as emulsions to precipitate proteins. Lignin also can be converted to pure low molecular weight chemicals; it may serve as an important feedstock for the chemical industry. At present, only vanillin and dimethyl sulfide are produced commercially and economically competitive processes for conversion to phenolic and aromatic chemicals are real possibilities.

Until the past 2–3 decades or so, large amounts of lignin were discarded into streams and waterways as dilute aqueous solutions. This is no longer tolerated, and almost all waste streams containing lignin are concentrated and burned. In the case of the paper industry, in order to conform to environmental quality guidelines, a number of primary and secondary treatment systems to control effluents are installed. Such treatment comprises use of clarifiers to remove 85–100 wt. % of solids in first treatment and aerated lagoons or otherwise, and employment of trickling filters, modified biological systems, charcoal treatment to remove 90–95% of BOD (Biochemical Oxygen Demand) in secondary treatment by which, most of the toxicity is removed with very little color. Ultrafiltrations have also been tried, but have been determined to be futile in removing total dissolved solids completely.

Oxygen demand is a significant parameter for determining the effect of organic pollutants in water. As microorganisms in the environment ingest the organic material, oxygen is depleted. This in turn can be harmful to fish and plant life. Wastewater from food processing is non-toxic but organic. High concentration of nutrients can be harmful for the environment. Extra quantities of nitrogen, fat and phosphorus require more oxygen for bacteria to decompose. If Chemical Oxygen Demand (COD)/Biochemical oxygen demand (B.O.D) content of the water is excessive, the oxygen supply in the water may be depleted below the level required to sustain aquatic life. The Chemical Oxygen Demand (COD) determination is a measure of the oxygen equivalent of that portion of the organic matter in a sample that is susceptible to oxidation by a strong chemical oxidant under controlled conditions. See Standard Methods for the Examination of Water and Wastewater (APHA, AWWA, WPCF), Washington, D.C., 20th Ed. (1998).

The main chemical compounds in wastewater are Chemical Oxygen Demand (COD), nitrogen, phosphorus, fats, oils and grease. COD and BOD are important parameters for measurement of organic matter content and oxygen needed to decompose the organic compounds. During the decomposition of organic matter there is less oxygen available in the sea and no oxygen in some places. It is possible to calculate COD or BOD into standard personal units, 60 g of oxygen to decompose the organic compounds from one person per day or equaling of 135 g of oxygen to decompose Chemical Oxygen Demand (COD) in waste water (COD= 2.25×BOD). Monitoring of COD is important for design and operation of wastewater treatment equipment.

a. Paper Industry:

The pulp and paper industry uses large amounts of water, which is recycled and reused resulting in temperature rise and dissolution of more solids in water. But this causes problems such as e.g. corrosion, slime and other deposits. Directly or indirectly all of these (i.e. BOD, color and toxicity) affect aquatic life.

Total dissolved solids are removed and used as energy source in fuel. Biomethanation has also been attempted. All these do not meet the standards of pollution control. Therefore it becomes very essential to remove color, total dissolved solids with negligible quantity of BOD and COD.

In the prior art, following methods are used for the separation of lignin from black waste liquid in paper industry:

(i) Purification of waste waters for installation of bleaching sulfate paper, Udeleholms A. B. Fr. Demande 2, 202,043 3 May 1974. Swed Appl. 12772/72 4 October. CA 82: 34833 g (1975):

Lignin and other organic matter are mostly precipitated from wastewater by addition of mineral acid and by filtration. The filtered wastewater is treated with feebly alkaline ion exchange resin activated with acid. The resin is then eluted with alkali to remove adsorbed lignin. The elute together with solution of original precipitate in alkali are recycled to the sulfate pulp process, preferably by burning in the black liquor recovery process. In this process the ion exchange resins used are commercially available chemical components.

(ii) Desulfurisation of waste gas with pulp waste liquor, Suyama A; Hayashi, H (Mitsubishi Kausha Ltd. Toyo Tokushi Kogyo K. K.) Jap. Kokai 76,20,089 17 Feb. 1976. CA 85: 67527a 9(1976):

Fiber free black liquor is used for waste gas desulfurisation and lignin in waste liquor is precipitated as lignin sulfate. The fiber is removed by boiling. Thus 1100 ppm $SO_2$ containing diesel oil boiler flue gas was desulfurised with boiled black liquor (pH 12) to 93%. The spent liquor was air oxidized and the coagulant was added to precipitate lignin and other substances.

(iii) Recovery of sodium hydroxide and black liquor from cellulose manufacture, Torras hostench S. A. Belg. 861, 585 31 Mar. 1977. Span Appl. 461, 364 4 Aug. 1977. CA 89: 61292 (1978):

An improved process for title recovery as compared to Spanish patent No. 29,158 comprises carbonation of spent liquor (preconcentrated to 40% from 10–15%) by treatment of pulp by bubbling $CO_2$ through a stream of spent liquor in a counter current system from bottom to the top of the liquor at 75–85° C. and 0.5 kg/cm$^2$ and treating the resulting silica-lignin precipitate with 0.03 N NaOH to redissolve the lignin for recycling to carbonated black liquor before further concentrating by evaporating.

(iv) Recovery of inorganic compounds from Kraft pulping black liquors, Domtar Inc. Jpn. Kokai Tokkyo Koho 58 36292 (83 36292) 3 Mar. 1985. Appl.382387 23 Jul. 1981. CA 99: 89814 h (1983):

Sodium compound from Kraft pulping black liquors are recovered by first acidifying the cool liquor with acids containing $H_2SO_4$ to Kraft black liquor by ultracentrifugation (UC) of liquor, followed by electrodialysis (E) of UC permeate treating deionate from E with acid to precipitate lignin and electrolytic $H_2O$ splitting of resulting solution.

(v) Removal of lignin alkaline waste pulping liquors, Ishikawa H.; Kade K. (Oji Paper Co. Ltd.). Jpn. Kokai Tokkyo JP 62 90398 (87 90 389) 24$^{th}$ Apr. 1987 85 226 870 October 1985. CA 107: 79 808 d (1987):

The title removal involved colloidising the solution lignin followed by ultrafiltration. Thus beech chips were cooked at effective alkali 14% sulfidity 25% liquor ratio 4 and 165. The resulting black liquor was filtered, adjusted to pH 11, 10 and 9 with $CO_2$ and ultra filtered to give delignification of 89%, 94% and 97% respectively.

(vi) Manufacture of methylolated lignin from black Kraft liquor residues, Dilling Peter (West Vaco Corp.) U.S. Pat. No. 4,764,597 16 Aug. 1988 Appl. 61 460 15 Jun. 1987 CA 109: 212612 v (1988):

Methylolated lignin is manufactured from black Kraft liquor residues by initially oxidizing black Kraft liquor containing lignin and salt in situ methylolation of lignin with an aldehyde followed by lowering the pH of the black Kraft liquor residue to precipitate methylolated lignin and finally recovering the precipitated methylolated lignin from black liquor residue. Thus a black Kraft residue (pH 13) was oxidized with air until the $Na_2S$ content was 1% and then stirred with 3 lb/mole HCHO/1000 lb lignin at 70 for 2 h. The black liquor containing methylolated lignin was acidified with $H_2SO_4$ to a pH of 4. The methylolated lignin was coagulated at 85, filtered, washed with water. The methylolated slurry was then treated with triethanolamine to a pH of 7 and then sufonated with $SO_2$ at 205° F. for 12 h to give sulfomethylolated, I amine salt useful as dispersant for azodyes.

(vii) Recovery of solids from black liquors, Caperos, S. A. Span ES 2, 006, 964 16 May 1989 Appl. 8, 801,697 27 May 1988. CA 114: 26042 n (1991):

Solids in black liquors are recovered, as precipitate by mixing 1 part black liquor with 0.1–1.0 parts reactive precipitating agents and separating the precipitate. The 1000 cm$^2$ black liquor E globules were mixed with 1000 cm$^2$ saturated solution of $CaCl_2$ in EtOH to form precipitate which was separated by centrifugation and washed with 1:1 EtOH water to give precipitate 134 g, organic components, 105 g lignin, 53 g and pentosans 8 g with 85% yield.

(viii) Areding process of paper black liquor with sulfurdioxide, Sun, L; Xu, Mu, H et al (Chinese Academy of Sciences, environment-estimating department). Faming Zhuangli Shenging Ganakai Shouming Shu. CA 1,050 064 20 Mar. 1991 Appl. 89 106 694 4 Sep. 1989 CA 115: 282382 t (1991):

The title process is described by heating black liquor with $SO_2$ to separate lignin and recover Na sulfite from the remaining acidic solution.

(ix) Treatment of black pulp liquor by conservation and precipitation, Zhang M; F Z; Shenging G; Shouming S. CA 1, 057 079. 18 Dec. 1991 Appl. 90, 104, 181 5 Jun. 1990 CA 117: 173 646 c (1992):

Black pulping liquor is treated by adding solid $CaCl_2$ or an aqueous solution containing $CaCl_2$ (2–5 g/100 ml) to black pulping liquor, coagulating and precipitating to remove lignin and recovering diluted NaOH solution. Thus 17.5 g lignin and 6 g/L NaOH aqueous solution were recovered by adding 3 g $CaCl_2$ in 100 ml sulfate black liquor (from preparing of pine pulp), precipitating and filtration.

In hitherto known processes main drawbacks are as follows:

1. The use of acidic media involves problems of corrosion.
2. Use of alkaline media causes further filtration problems due to colloidal particles. These processes result in incomplete removal of organics as well as inorganic matter from the effluent resulting into colored effluent water, due to organics such as lignin and mellanoidin.

b. Alcohol Industry:

The alcohol industry (i.e., the production of consumable liquors containing ethyl alcohol) in India uses molasses as the principal raw material. The alcohol recovery ranges from 7 to 9% from the molasses. Fermentable sugars, organic and inorganic chemicals in the molasses find their way into effluents, which causes high BOD/COD. This effluent, known as "spent wash", is also acidic in nature, forms hydrogen sulfide, emanating bad odor having black color and hence cannot be disposed as such into the water stream. In the spent wash, origin of black color is due to plant pigment melanoidins, polyphenolic compounds, caramels, which are produced by thermal degradation and condensation reaction of sugar. Spent wash contains lignin and colouring material.

In the prior art, following methods are used for the separation of coloring bodies from spent wash in alcohol industries:

This is mainly useful to minimize industrial pollution due to the spent wash.

(i) Apparatus for the decolorizing molasses, Chida, T, Tsuboi, H. Jpn. Kokai. 77, 90, 639, 30 Jul. 1977, pp.3, CA 88: 24490c. (1978):

Molasses was decolorized with active carbon in an adsorption tower containing plate electrodes impressed with d. c. voltage. The pigments were di-electric, polarized by electrodes and adsorbed by active carbon. Thus molasses was decolorized 98% in an adsorption tower containing granular active carbon and vertical carbon electrodes at 10 cm intervals at 0.1 A/dm$^2$ and 8V with retention time 3 h.

(ii) Purification of molasses, Kaga T, Hiramoto, T; Hamanaka, K; Sato, M. & Tokida Y. Jpn. Kokai 77, 108, 035. 10 Sep. 1977, pp.7,. CA 88: 75566q. (1978):

Granular active carbon was used to decolorize brown liquors of Brix 62–3 and stammer color 5.2–5.4 was passed through a regenerated active column at 75–8° C. and solids carbon ratio 100 with 64% decolourization and molasses having Brix 35–6 pH 5.8 & stammer color 70 was passed through the same column at 72–3° C.

(iii) Removal of coloring substances from molasses solutions, Shvets V N; Knogotkova F I; Pavyuchenko L N. Izv. Vyssh Uchebn. Zewed Pisheh. Technol. 1977, (4) 31–5, 88: 8827n. (1978):

The filtration of molasses diluted to 35% with water through a column filled with AV-16GS. (12626-33-4) anion exchanger in chloride form, removed >50% of colored substances and organic impurities. The effectiveness of removal of these substances decrease in order invert sugar>melanoidins>caramels. The decrease in the concentration of molasses improved its decolourization by exchanger. Colored substances in molasses could be coagulated by d. c. and removed by filtration but the procedure was effective only below 50% molasses conc., colored substances in molasses are not adsorbed by Soviet AGS-4 activated carbon.

(iv) Sorption of sugar coloring substances on ion exchangers, Wyroba A. Zesz. Nauk. Univ-Jagiellon Pr.Chem. 1976, 21, 355–61. CA 88: 8826 m.(1978):

The decoloring power of ion exchange resin towards molasses (A) sugar from 3rd crystal (B), thick syrup (C) and clear syrup (D) is not the same. Thus centranol W-291 (I) (51258-00-5) and Amberlite IRA-900 (9050-97-9) reduce best the color of A & B or Amberlite IRA-68 II (9056-59-1) can be used for decolouring C & D is best decolorized by II, although Amberlite IRA-4015 (9036-93-S) can also be used. A and C can be efficiently decolorized with carboraffina activated carbon.

(v) Methods for improved determination of sugar content in dark colored products of sugar industry, Zagorulko A. Ya.; Boiko E. S.; Korobeinikova L. A.; Ponomarenko A.; Burlyai T. F. Sakh Prom-St 1978 (1) 65–6. CA 88:91344w. (1979):

Colored substances present in the intermediate of sugar manufacture and molasses can be removed by combined treatment first with Pb(OAC) 4 (546-67-8) and then with activated carbon. The decolorized solutions are made up to known volumes and used for the polarimetric/polometric of sucrose (I) (57-50-1). Activated carbon does not absorb (I) (87-50-1) and it does not require washing after it is filtered off.

(vi) Waste water treatment, Sakurai, S. Jpn. Kokai Tokyo Koho. 79 51,250. 21 Apr. 1979. CA 91: 78574p. (1979):

Hydrogen peroxide solution is added to waste water, then the pH is adjusted to <4 and waste water electrolyzed with an Fe anode to oxidize soluble pollutants. Adjusting the pH in the range of 6.0–8.5 flocculates the insoluble pollutants.

In hitherto known processes, main drawbacks are the use of acidic media, which involves problems of corrosion, filtration due to colloidal particles and incomplete removal of organics as well as inorganic matter in effluent water and colored effluent water due to presence of organic matter mainly lignin and mellanoidin.

c. Sewage Treatment

Many studies have been conducted on the use of red marine algae such as *Porphyra* and *Liagora* for the treatment of effluents. The following references will be useful to assess the use of red algae in general and *Porphyra* & *Liagora* in sewage disposal plants:

(i) Effect of effluent from sewage disposal plant of the growth of *Porphyra*, Ohgai, M.; Sugimoto, T.; Murase, N.; Suisan, Z. 1994 42(1), 41–6, CA 121: 153004w. (1994):

A laboratory culture study was made to examine the effect of effluent for sewage disposal plant on the growth of *Porphyra* and 4 species of diatoms. The culture media are prepared for different concentrations of effluents. The growth of conchospores and thalli of *Porphyra* was slightly accelerated by the addition of effluent at a concentration of about 0.3–10.0%. Similar growth trend was observed in species of diatoms. Growth was suppressed at 30.0% effluent concentration.

(ii) Toxicity bio-assay of the municipal sewage effluents using seaweed Toshiro, M.; Akio, M.; Kankyo, M. 1993 16(5), 327–38, CA 119: 209657q. (1993):

Bioassay techniques for testing treated wastewater and toxic chemicals in seawater by monitoring seaweed growth are discussed. Strongest toxic substances for growth of *Porphyra* were monochloramines resulting from chlorinated sewage.

(iii) Studies on the effects of municipal waste water on the growth of *Porphyra*, Toshiro, M.; Kazuo, O.; Akio, A.; Tomao, Y.; Suisun, N.; 1988 54(10) CA 110: 34929q. 191989):

Four kinds of chlorinated solutions were investigated to identify the causative substance inhibiting the growth of *Porphyra yezoensis* thalli. Inhibitory effects were measured in terms of length and number of dead cells. Tests were conducted using cultures dosed with chlorinated municipal sewage effluent after nitrification and chlorinated ion exchange water respectively. Chloramine and chlorinated ion exchanged water was considered to be the causative substance in the growth inhibition of *Porphyra*.

(iv) Utilization of nitrogen and phosphorus from treated sewage and bay sediment by marine algae, Nobuyoshi, I.; Kunio, K.; Yuji, O.; Takashi, N.; Zasshi, G.; 1987 42(1/2) CA 108; 173165j. (1988):

*Porphyra yzoensis* preferred $NH_4$—N to $NO_3$—N in the growth medium. But growth was affected when $NH_4$—N level became >8 and 12 mg/L resulting in rapid decrease of cell number and death of almost all cells at 32 mg/L after 4 days.

(v) The bioaccumulation of metals by *Rhodophyta* sp., Malea, P.; Haritonidis, S.; Stratis, I. 1994 37(6), 505–13, CA 122: 169365w.9 (1995):

The bioaccumulation of Fe, Cu, Zn, Cd, Pb, Na, K, Ca and Mg by seven species of red algae (*Rhodophyta*) were studied after their seasonal collections from 9 stations in Antikgra Gulf. This area is characterized by its bauite substrate and discharge of waste from an aluminum factory. No metal in *Liagora* showed a significant correlation with the concentration of the dissolved metals in seawater.

(vi) Polysaccharide of algae 43 neutral xylan and sulfated xylomannan from red seaweed, Usor, A. I.; Dobkina, I. M.; 1991 17(8) CA 115: 275755p. (1992):

Sulfated xylomannan and several fractions of neutral polysaccharides have been isolated from red alga *Liagora*. Water-soluble neutral xylan purified through copper complex was shown to be a linear polymer having β-1-4 and B-1-3 linkages between D-xylopyranose residues at a ratio of 6:1. Ion sulfated polysaccharide was investigated using partial hydrolysis, methylation after and before desulfation as 13C NMR spectroscopy.

(vii) Polysaccharide of algae, Usov, A. I.; Dobkina, I. M. 1988 14(5), CA 109 :70387z. (1989):

A sulfated xylomannan and several fractions of neutral polysaccharides were isolated from red seaweed *Liagora*. Xylomannan was shown to contain D-mannose and D-xylose of sulfate and has a linear backbone of alpha-1-3 linked d-mannopyranose residues. On the average there are two branching points and seven sulfate groups attached to position 6 & 2 at a ratio of about 2:1 at every 14 mannopyranose residues of the main chain.

(viii) Chemical study of Cuban seaweed, Estevez, M. L.; Olivan, D. L; Velazquez, R. 1985 1(1), 87–93, CA 104: 165402m, (1986):

Polysaccharides were examined from 13 species of red algae collected on Cuban coast and soluble sulfated polysaccharides were found in predominant amounts. Polysaccharides are primarily composed of galactose. These alga form a firm carrageenan gel when polysaccharide yield of >30% of dry weight were attained from alga.

There is continued interest on development of new improved processes for separation of lignin, organic matters, and inorganic compounds from spent wash produced in the distillery wastes of the alcohol industry and black liquor products from pulp and paper mills in the paper industry. It is a known fact that lignin-containing effluents are not degradable and hence cause disposal problems in the environment.

OBJECTS OF THE INVENTION

The main object of the present invention is to provide a process for the treatment of effluents from the alcohol and paper industry to produce potable water using marine red algae. Yet another object is to treat the effluents in a manner so as conform with environmental rules and standards. Yet another object is to provide a process for the treatment of industrial effluents to produce potable water using red algae essentially having polysaccharide with sulfate or acetyl group on cell wall and galactopyranose residues on cell membrane.

BRIEF SUMMARY OF THE INVENTION

The invention provides a process for the treatment of industrial effluents to produce potable water, using marine algae. Specifically, the invention concerns the separation of organic substances such as lignin and other colouring matter from industrial effluents by treatment of the effluents with marine algae such as *Porphyra* and *Liagora*.

Seaweeds are the source of gel forming polysaccharides (phycocolloides) and widely used in industry as emulsifying agents, gelling agents, stabilizers, thickeners and suspension agents. The chemical structure of *Liagora* reveals the presence of a sulfated xylomannan and several fractions of neutral polysaccharides and other charged groups like mannans and xylans having phycocolloid properties and are anionic in nature. Polyelectrolytes with marked cation exchange properties are significant in plants living in saline medium. Further at pH>3 sulfated polysaccharide, xylomannan, several fractions of neutral polysaccharides like D-xylopyranose, D-mannose and D-mannopyranose are responsible for the selective adsorption of coloring chromophores and potassium with the adsorption of the lignin polyphenolic bodies. In accordance with the invention, the obtained pale yellow effluent can be treated with calcarious material particularly lime powder CaO>98%, ion exchange system and activated carbon to remove organics, inorganics and trace of coloring matter to colorless water which can be recycled in the process in a period ranging up to 4–6 hours.

In the process of the present invention, lignin, phenolic compounds, pigments and other substances and sugars are separated by treating the spent wash with sea weeds e.g. *Porphyra, Liagora* and calcareous material preferably lime powder. The applicants, during their study on marine algae, found that in the presence of *Porphyra*, chemical structure 1,3 linked β-D-galactopyranose and 1,4-linked 3,6-anhydrous alpha-L-galactopyranose and other charged groups like mannans and xylans have better phycocolloid properties and are anionic polyelectrolytes with marked cation exchange properties are of significance in plants living in saline medium. After carefully going through the literature, it is noticed that use of seaweed polysaccharide of *Porphyra* as a decolorizing agent is not mentioned.

The combination of *Porphyra* and lime powder was found to remove organics, inorganics and the removal of the color of spent wash from black to pale yellow, which was further treated with active carbon to get almost colorless liquid. The treated effluent was found to be passing BOD, COD and all the other parameters of effluent treated water required by the environmental agencies. All the operations in this process are done at room temperature, hence saves energy costs, the treated water can be recycled to the process. The resins used in the process can be generated with known methods.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Accordingly, the present invention provides an improved process for the treatment of diluted effluents containing lignin from pulp mills, paper mills or the liquor manufacturing industry to produce potable water which process comprises the steps of:

(i) contacting the diluted effluents with a marine red algae selected from the group consisting of *Porphyra* and *Liagora*, the marine red algae containing polysaccharides and having sulfate/acetyl functional groups on their cell walls and galactopyranose in their cell membrane, for a period of at least 30 minutes;

(ii) treating the diluted effluents from step (i) with calcareous material for a period of at least 30 minutes thereby forming a coagulated material and a supernatant;

(iii) separating the coagulated material from the supernatant from step (ii);

(iv) treating the supernatant from step (iii) with an ion-exchange resin and filtering the treated supernatant to obtain a filtrate; and (v) passing the filtrate from step (iv) over a column of activated carbon to produce potable water.

In another embodiment, the effluents may be diluted about 5 times with water selected from tap water, mineral water, natural water, distilled water, demineralized water. In still another embodiment, the effluents are contacted with marine algae for a period of about 30–120 minutes, and treatment with calcareous material may be effected for 30–120 minutes. In still another embodiment the calcareous material is selected from $CaCO_3$, lime, bone powder, shell powder, diatomaceous earth, salts of calcium and natural sources thereof. In another aspect, the ratio of marine red algae and calcareous material to diluted effluent preferably ranges from 0.50 to 2.00 g per 100 ml. Yet another aspect is that the said algae used may be in the form of dried powder or embedded in neutral matrix or in natural form. In another embodiment the ion exchange resin is selected from anion/cation exchanger resins such as commercially available IR-120, IR-400 and IRC-50.

In a feature of the present invention, the conventional methods used to separate the coagulated impurities may be sedimentation, filtration or centrifugation. In another feature of the present invention, the treated effluent was found to be meeting all standards of the Pollution Control Act such as COD/BOD levels, total dissolved solids & color. The final water produced at the end of the process is colorless. In yet another feature, all operations of the process are effected at room temperature without the use of mineral acid to render the effluents substantially free of organic and inorganic matter and the treated water can be recycled to the process or let the natural resource. The resin used in the process can be regenerated by conventional methods.

In a preferred embodiment of the invention, the amount of *Porphyra* and *Liagora* used is within the range of from about 0.15% and about 2.00%, and more preferably in the range between about 0.25% and about 1.0%, based upon the total weight of the effluent being treated. In a preferred embodiment of the invention, the amount of calcareous material used is within the range between about 0.15% and about 2.00%, and more preferably in the range between about 0.25% and about 1.0%, based upon the total weight of the effluent being treated. In another preferred embodiment of the invention, the effluent is diluted with water prior to treatment such that an effluent to water diluent ratio is maintained within the range of from about 1:1 to about 1:5, and more preferably within the range of from about 1:3 to 1:5.

Generally speaking, the effluent water generated by the alcohol industry has a COD level in the range of about 90,000 to about 120,000 mg/L (ppm) and a BOD level in the range of about 20,000±5,000 ppm. The effluent water from the paper industry has a COD level in the range of about 15,000 to about 35,000 mg/L (ppm) and a BOD level of about 4,000 to 5,000 ppm. Thus, the present invention provides a method of treating effluent water having an initial Chemical Oxygen Demand in the range of about 15,000 to about 120,000 ppm and an initial Biological Oxygen Demand in the range of about 4,000 to about 20,000 ppm.

Effluents from the paper industry characteristically include soluble lignin salts of polyphenolic bodies, for example, coniferyl, sinapyl and p-coumaryl, typically from about 3% to about 6% by weight, alcohols, and pigments, such as melanoidins. Effluents from the alcohol industry characteristically include fermentable sugars, plant pigments, lignin, caramels, reducing sugars, sulphated ash, carbonated ash, dry matter and oxides of magnesium, potassium, phosphorous, aluminium, iron and sulphites and bisulphites of sodium, potassium.

Preferably, the reduction from initial BOD (i.e., prior to treatment) to final BOD (i.e., after treatment) is in the range of from about 97.35% to about 99.99%, and more preferably from about 98.5% to about 99.9%. Preferably, the reduction from initial COD (i.e., prior to treatment) to final COD (i.e., after treatment) is in the range of from about 94.0% to about 99.99%, and more preferably in the range of from about 95.0% to about 99.85%. Preferably, the final BOD and COD of treated water is within the range of from about 15 to about 35 mg/L and from about 10 to about 100 mg/L, respectively, and more preferably is within the range of from about 20 to about 26 mg/L and from about 12 to about 88 mg/L, respectively.

In the preferred embodiment of the invention, the diluted effluent is contacted with *Porphyra* or Ligora under stirring for a period ranging from about 30 minutes to about 5 hours, and more preferably for a period of from about 30 minutes to about 2 hours. Treatment with Indion resin and further treatment with IR-400 resin is carried out continuously by passing effluent through columns containing such ion-exchange resins. In the preferred embodiment of the invention, the ion-exchange resin or resins used are selected from anionic and cationic ion-exchange resins belonging to Indion type ino-exchange resins.

The invention is described hereinafter, with reference to the following examples, which are illustrative only and should not be construed to the limit of the scope of present invention.

EXAMPLE 1

20 ml of black liquor from the paper industry was diluted to 100 ml with water and then contacted with *Porphyra* dried powder 1 g, under stirring for 2 hours followed by addition of lime powder 1.0 g. The sludge was separated by filtration and the filtrate was treated with Indion resin (20 ml) at a pH of about 2–3. The filtrate was again passed through a column of IR-400 resin. The elute was passed over column of activated carbon (5 g) to obtain colorless water with no organic matter. Color reduction was 92%. The initial COD of black liquor was 7712.64 mg/L and after *Porphyra* and lime treatment was brought down 1021.76 mg/L, and further to 12 mg/L with ion exchange system. The BOD of colorless water obtained was 26.

EXAMPLE 2

20 ml of black liquor from the paper industry was diluted to 100 ml with water and then contacted with *Porphyra* dried powder 0.5 g, under stirring for 2 hours followed by addition of lime powder 0.5 g. The sludge was separated by filtration and the filtrate was treated with indion resin (20 ml) to bring its pH to 2–3. The filtrate was again passed through a column of IR-400 resin. The elute was passed over column of activated carbon (5 g) to obtain colorless water with no organic matter. Color reduction was 94%. The initial COD of black liquor was 7712.64 mg/L and after *Porphyra* and lime treatment was brought down to 1326.40 mg/L and further to 60 mg/L with ion exchange system. The BOD of the colorless water obtained was 20.

EXAMPLE 3

20 ml of black liquor from the paper industry was diluted to 100 ml with water and then contacted with *Porphyra* dried powder 0.25 g under stirring for 2 hours followed by addition of lime powder 0.25 g. The sludge was separated by filtration and the filtrate was treated with Indion resin (20) ml to bring its pH to 2–3. The filtrate was again passed through a column of IR-400 resin. The elute was passed over column of activated carbon (5 g) to obtain colorless water with no organic matter. Color reduction was 93%. The initial COD of black liquor was 7721.64 mg/L and after *Porphyra* and lime treatment was brought down to 2229.89 mg/L and further to 88 mg/L with ion exchange system. The BOD of the colorless water obtained was 22.

EXAMPLE 4

20 ml of black liquor from the paper industry was diluted to 100 ml with water and then contacted with *Liagora* dried powder 1 g under stirring for 2 hours followed by addition of lime powder 1.0 g. The sludge was separated by filtration and the filtrate was treated with Indion resin (20 ml) to bring its pH to 2–3. The filtrate was again passed through a column of IR-400 resin. The elute was passed over column of activated carbon (5 g) to obtain colorless water with no organic matter. Color reduction was 86%. The initial COD of black liquor was 7712.64 mg/L and after *Liagora* and lime treatment was brought down to 995.4 mg/L and further to 12 mg/L with ion exchange system. The BOD of the colorless water obtained was 26.

EXAMPLE 5

20 ml of black liquor from the paper industry was diluted to 100 ml with water and then contacted with *Liagora* dried powder 0.5 g under stirring for 2 hours followed by addition of lime powder 0.5 g. The sludge was separated by filtration and the filtrate was treated with Indion resin (20 ml) to bring its pH to 2–3. The filtrate was again passed through a column of IR-400 resin. The elute was passed over column of activated carbon (5 g) to obtain colorless water with no organic matter. Color reduction was 94%. The initial COD of black liquor was 7712.64 mg/L and after *Liagora* and Lime treatment was brought down to 1033.4 mg/L and further to 60 mg/L with ion exchange system. The BOD of the colorless water obtained was 20.

EXAMPLE 6

20 ml of black liquor from the paper industry was diluted to 100 ml with water and then contacted with *Liagora* dried powder 0.25 g under stirring for 2 hours followed by addition of lime powder 0.25 g. The sludge was separated by filtration and the filtrate was treated with Indion resin (20 ml) to bring its pH to 2–3. The filtrate was again passed through a column of IR-400 resin. The elute was passed over column of activated carbon (5 g) to obtain colorless water with no organic matter. Color reduction was 97%. The initial COD of spent wash was 7712.64 mg/L and after *Liagora* and lime treatment was brought down to 2021.76 mg/L and further to 88 mg/L with ion exchange system. The BOD of the colorless water obtained was 22.

EXAMPLE 7

20 ml of spent wash from the alcohol industry was diluted to 100 ml with water and then contacted with *Porphyra* dried powder 1 g under stirring for 2 hours followed by addition of lime powder 1.0 g. The sludge was separated by filtration and the filtrate was treated with Indion resin (20 ml) to bring its pH to 2–3. The filtrate was again passed through a column of IR-400 resin. The elute was passed over column of activated carbon (5 g) to obtain colorless water with no organic matter. Color reduction was 89%. The initial COD of spent wash was 58032.00 mg/L and after *Porphyra* and Lime treatment was brought down 4567.68 mg/L and further to 12 mg/L with ion exchange system. The BOD of the colorless water obtained was 26.

EXAMPLE 8

20 ml of spent wash from the alcohol industry was diluted to 100 ml with water and then contacted with *Porphyra* dried powder 0.5 g under stirring for 2 hours followed by addition of lime powder 0.5 g. The sludge was separated by filtration and the filtrate was treated with Indion resin 20 ml to bring its pH to 2–3. The filtrate was again passed through a column of IR-400 resin. The elute was passed over column of activated carbon (5 g) to obtain colorless water with no organic matter. Color reduction was 86%. The initial COD of spent wash was 58032.00 mg/L and after *Porphyra* and Lime treatment was brought down to 3706.56 mg/L and further to 60 mg/L with ion exchange system. The BOD of the colorless water obtained was 20.

EXAMPLE 9

20 ml of spent wash from the alcohol industry was diluted to 100 ml with water and then contacted with *Porphyra* dried powder 0.25 g under stirring for 2 hours followed by addition of lime powder 0.25 g. The sludge was separated by filtration and the filtrate was treated with Indion resin (20 ml) to bring its pH to 2–3. The filtrate was again passed through a column of IR-400 resin. The elute was passed over column of activated carbon (5 g) to obtain colorless water with no organic matter. Color reduction was 98%. The initial COD of spent wash was 58032.00 mg/L and after *Porphyra* and Oyster treatment was brought down to 3600.29 mg/L and further to 88 mg/L with ion exchange system. The BOD of the colorless water obtained was 22.

EXAMPLE 10

20 ml of spent wash from the alcohol industry was diluted to 100 ml with water and then contacted with *Liagora* dried powder 1 g under stirring for 2 hours followed by addition of lime powder 1.0 g. The sludge was separated by filtration and the filtrate was treated with Indion resin (20 ml) to bring its pH to 2–3. The filtrate was again passed through a column of IR-400 resin. The elute was passed over column of activated carbon (5 g) to obtain colorless water with no organic matter. Color reduction was 97%. The initial COD of spent wash was 58032.00 mg/L and after *Liagora* and Oyster treatment was brought down to 1235.52 mg/L and further to 12 mg/L with ion exchange system. The BOD of the colorless water obtained was 26.

EXAMPLE 11

20 ml of spent wash from the alcohol industry was diluted to 100 ml with water and then contacted with *Liagora* dried powder 0.5 g under stirring for 2 hours followed by addition of lime powder 0.5 g. The sludge was separated by filtration and the filtrate was treated with Indion resin (20 ml) to bring its pH to 2–3. The filtrate was again passed through a column of IR-400 resin. The elute was passed over column of activated carbon (5 g) to obtain colorless water with no organic matter. Color reduction was 94%. The initial COD of spent wash was 58032.00 mg/L and after *Liagora* and Lime treatment was brought down to 1834.56 mg/L and further to 60 mg/L with ion exchange system. The BOD of the colorless water obtained was 20.

EXAMPLE 12

20 ml of spent wash from the alcohol industry was diluted to 100 ml with water and then contacted with *Liagora* dried powder 0.25 g under stirring for 2 hours followed by addition of lime powder 0.25 g. The sludge was separated by filtration and the filtrate was treated with Indion resin (20 ml) to bring its pH to 2–3. The filtrate was again passed through a column of IR-400 resin. The elute was passed over a column of activated carbon (5 g) to obtain colorless water with no organic matter. Color reduction was 88%. The initial COD of spent wash was 58032.00 mg/L and after *Liagora* and lime treatment was brought down to 2000.07 mg/L and further to 88 mg/L with ion exchange system. The BOD of the colorless water obtained was 22.

The experimental conditions and results from Examples 1–6 and 7–12 above are set forth in Tables 1 and 2, respectively, below:

TABLE 1

|  | Ex. 1 | Ex. 2 | Ex. 3 | Ex. 4 | Ex. 5 | Ex. 6 |
|---|---|---|---|---|---|---|
| Effluent | 20 ml | 20 ml | 20 ml | 20 ml | 20 ml | 20 ml |
| After Dilution | 100 ml | 100 ml | 100 ml | 100 ml | 100 ml | 100 ml |
| Porphyra | 1 g | 0.5 g | 0.25 g | — | — | — |
| Liagora | — | — | — | 1 g | 0.5 g | 0.25 g |
| Lime | 1 g | 0.5 g | 0.25 g | 1 g | 0.5 g | 0.25 g |
| Indion resin | 20 ml | 20 ml | 20 ml | 20 ml | 20 ml | 20 ml |
| Color Reduction | 92% | 94% | 93% | 86% | 94% | 97% |
| Initial COD (mg/L) | 7,712.64 | 7,712.64 | 7,712.64 | 7,712.64 | 7,712.64 | 7,712.64 |
| COD after 1st step | 1,021.76 | 1,326.4 | 2,229.89 | 995.4 | 1,033.4 | 2,021.76 |
| Final COD | 12 | 60 | 88 | 12 | 60 | 88 |
| COD Reduction | 95.0% to 99.0% | | | | | |
| Initial BOD (ppm) | 5,000 | 5,000 | 5,000 | 5,000 | 5,000 | 5,000 |
| Final BOD | 26 | 20 | 22 | 26 | 20 | 22 |
| BOD Reduction | 99.4% to 99.6% | | | | | |

TABLE 2

|  | Ex. 7 | Ex. 8 | Ex. 9 | Ex. 10 | Ex. 11 | Ex. 12 |
|---|---|---|---|---|---|---|
| Effluent | 20 ml | 20 ml | 20 ml | 20 ml | 20 ml | 20 ml |
| After Dilution | 100 ml | 100 ml | 100 ml | 100 ml | 100 ml | 100 ml |
| Porphyra | 1 g | 0.5 g | 0.25 g | — | — | — |
| Liagora | — | — | — | 1 g | 0.5 g | 0.25 g |
| Lime | 1 g | 0.5 g | 0.25 g | 1 g | 0.5 g | 0.25 g |
| Indion resin | 20 ml | 20 ml | 20 ml | 20 ml | 20 ml | 20 ml |
| Color Reduction | 89% | 86% | 98% | 86% | 94% | 97% |
| Initial COD (mg/L) | 58,032.0 | 58,032.0 | 58,032.0 | 58,032.0 | 58,032.0 | 58,032.0 |
| COD after 1st step | 4,567.68 | 3,706.56 | 3,600.29 | 1,235.52 | 1,834.56 | 2,000.7 |
| Final COD | 12 | 60 | 88 | 12 | 60 | 88 |
| COD Reduction | 95.62% to 99.75% | | | | | |
| Initial BOD (ppm) | 5,000 | 5,000 | 5,000 | 5,000 | 5,000 | 5,000 |
| Final BOD | 26 | 20 | 22 | 26 | 20 | 22 |
| BOD Reduction | 99.4% to 99.6% | | | | | |

EXAMPLE 13

Six 20 ml aliquots of black liquor from the paper industry were diluted with fresh water in the effluent to water ratios shown in Table 3 below. The aliquots were then contacted with *Liagora* dried powder under stirring for 2 hours followed by addition of lime powder. The sludge was separated by filtration and the filtrate was treated with Indion resin (20 ml) to bring its pH to 2–3. The filtrate was again passed through a column of IR-400 resin and then passed over a column of activated carbon (5 g). The percentage color reduction was recorded, and reported in Table 3 below:

TABLE 3

| Sample No. | Effluent to Water | Percent Color Reduction |
|---|---|---|
| 13a | 1:0 | 0% |
| 13b | 1:1 | 8% |
| 13c | 1:2 | 17% |
| 13d | 1:3 | 56% |
| 13e | 1:4 | 69% |
| 13f | 1:5 | 96% |

EXAMPLE 14

Six 20 ml aliquots of spent wash from the alcohol industry were diluted with fresh water in the effluent to water ratios shown in Table 3 below. The aliquots were then contacted with *Liagora* dried powder under stirring for 2 hours followed by addition of lime powder as per example 13. The sludge was separated by filtration and the filtrate was treated with Indion resin (20 ml) to bring its pH to 2–3. The filtrate was again passed through a column of IR-400 resin and then passed over a column of activated carbon (5 g). The percentage color reduction was found to be the same as reported in Table 3.

As illustrated above, all other materials indicated in objectives and embodiments are found equally effective though not illustrated by the examples.

Advantages of the present invention.

1. The main advantage of the present invention is that the said method is used for treating non-degradable lignin containing effluents, since the disposal of such non-degradable lignin is causing environmental problems.
2. The treated water from this process can be recycled for diluting further effluents for treating
3. All the operations in this process are carried out at room temperature, hence saves energy costs.
4. The ion-exchange resins used in the process can be regenerated and used for further treatment of water.

Further advantages of the present invention include: (1) the process of the present invention is cost effective & environment friendly; (2) it makes use of natural resources which are degradable biologically and not harmful to the ecosystem; (3) the process results in producing colorless, potable water which meets all the environment control board stipulated standards; and (4) the water thus produced either can be useful for recycling in the process or let into the natural resources.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A process for the treatment of effluents to produce potable water which process comprises the steps of:
   (i) diluting effluents from pulp mills, paper mills or the alcohol manufacturing industry having an initial chemical oxygen demand in the range of about 15,000 to about 120,000 ppm with a water diluent such that an effluents to water diluent ratio is maintained within the range of from about 1:1 to about 1:5;
   (ii) contacting the diluted effluents with a marine red algae selected from the group consisting of *Porphyra* and *Liagora* in an amount within the range of from about 0.15% to about 2.00% by weight of the diluted effluents for a period of from about 30 minutes to about 5 hours;
   (iii) treating the diluted effluents from step (ii) with calcareous material for a period of at least 30 minutes thereby forming a coagulated material and a supernatant;
   (iv) separating the coagulated material from the supernatant of step (iii);
   treating the supernatant of step (iv) with an ion-exchange resin to obtain a clear filtrate; and
   (vi) passing the clear filtrate of step (v) over a column of activated carbon to produce potable water having a final chemical oxygen demand that is from about 94.0% to about 99.99% lower than the initial Chemical Oxygen Demand of the effluents.

2. The process as claimed in claim 1 wherein the calcareous material is selected from the group consisting of $CaCO_3$, lime, bone powder, shell powder, diatomaceous earth, and salts of calcium.

3. The process as claimed in claim 1, wherein the effluents are diluted in step (i) about 5 times with the water diluent.

4. The process as claimed in claim 1 wherein the diluted effluents are contacted with the marine red algae for a period of about 30 to 120 minutes and treated with the calcareous material for a period of about 30 to 120 minutes.

5. The process as claimed in claim 1 wherein the marine red algae is used in dry powder form.

6. The process as claimed in claim 1 wherein the ion exchange resin is an anion/cation exchange resin.

7. The process as claimed in claim 1 wherein the separation of the supernatant from the coagulated material is effected by a method selected from the group consisting of sedimentation, filtration and centrifugation.

8. The process as claimed in claim 1 wherein colorless potable water is produced.

9. The process as claimed in claim 1 wherein the chemical oxygen demand of the potable water produced in step (vi) is in the range of from about 12 to about 88 mg/L.

10. The process as claimed in claim 1 wherein the potable water produced in step (vi) has a biological oxygen demand in the range of from about 20 to about 26 mg/L.

11. The process as claimed in claim 1 wherein the treatment of diluted effluents is carried out at ambient temperatures.

12. The process as claimed in claim 1 wherein the supernatant from step (iv) is treated with the ion exchange resin until it attains a pH range of about 2 to about 3.

* * * * *

UNITED STATES PATENT AND TRADEMARK OFFICE
CERTIFICATE OF CORRECTION

PATENT NO. : 6,929,942 B2
DATED : August 16, 2005
INVENTOR(S) : Moghe et al.

It is certified that error appears in the above-identified patent and that said Letters Patent is hereby corrected as shown below:

Title page,
Item [54], Title, delete "WAFER" and insert -- WATER --.

Signed and Sealed this

Fourth Day of October , 2005

JON W. DUDAS
*Director of the United States Patent and Trademark Office*